(12) United States Patent
Goto

(10) Patent No.: US 10,003,232 B2
(45) Date of Patent: Jun. 19, 2018

(54) ROTARY ELECTRIC MACHINE AND STATOR MANUFACTURING METHOD

(75) Inventor: Kazuhiro Goto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 541 days.

(21) Appl. No.: 14/346,397

(22) PCT Filed: Dec. 28, 2011

(86) PCT No.: PCT/JP2011/080432
§ 371 (c)(1),
(2), (4) Date: Mar. 21, 2014

(87) PCT Pub. No.: WO2013/099001
PCT Pub. Date: Jul. 4, 2013

(65) Prior Publication Data
US 2014/0225465 A1    Aug. 14, 2014

(51) Int. Cl.
*H02K 15/04* (2006.01)
*H02K 3/28* (2006.01)
(Continued)

(52) U.S. Cl.
CPC ............. *H02K 3/28* (2013.01); *B23K 9/167* (2013.01); *H02K 3/12* (2013.01); *H02K 15/0081* (2013.01);
(Continued)

(58) Field of Classification Search
CPC ........ H02K 3/28; H02K 3/12; H02K 15/0081; H02K 15/0414; B23K 9/167; B23K 2201/38; Y10T 29/49009
(Continued)

(56) References Cited

U.S. PATENT DOCUMENTS

| | | | | | |
|---|---|---|---|---|---|
| 5,994,813 | A | * | 11/1999 | Umeda | H02K 1/165 29/596 |
| 6,181,043 | B1 | * | 1/2001 | Kusase | H02K 3/12 310/180 |

(Continued)

FOREIGN PATENT DOCUMENTS

| | | |
|---|---|---|
| JP | 2000-218366 A | 8/2000 |
| JP | 2001-238386 A | 8/2001 |

(Continued)

OTHER PUBLICATIONS

English translation of JP 2000218366; Kato et al.; dated Aug. 8, 2000.*

*Primary Examiner* — Bernard Rojas
*Assistant Examiner* — Ahmed Elnakib
(74) *Attorney, Agent, or Firm* — Hunton Andrews Kurth LLP

(57) ABSTRACT

In order to provide a rotary electric machine with a reduced size and improved weldability, the stator of a rotary electric machine has a segment coil formed by bending rectangular conductors, and a stator core having slots in which the segment coil is inserted. As for the weld parts formed at the tips of the lead parts of the segment coil which protrude from the end face of the stator core and are twisted together, at least one of the weld beads aligned in the radial direction of the stator is an oblong body that is long in the radial direction of the stator core, and the angle formed by the longitudinal direction of the oblong body and the axial direction of the stator core is less than 90 degrees in a core cross section that includes the central axis of the stator core.

2 Claims, 17 Drawing Sheets

(51) Int. Cl.
*B23K 9/167* (2006.01)
*H02K 3/12* (2006.01)
*H02K 15/00* (2006.01)
*B23K 101/38* (2006.01)

(52) U.S. Cl.
CPC ...... *H02K 15/0414* (2013.01); *B23K 2201/38* (2013.01); *Y10T 29/49009* (2015.01)

(58) Field of Classification Search
USPC .............................. 310/71, 179–208; 29/596
See application file for complete search history.

(56) References Cited

U.S. PATENT DOCUMENTS

| | | | |
|---|---|---|---|
| 6,841,913 B2* | 1/2005 | Gorohata | H02K 3/12 29/596 |
| 2003/0137207 A1 | 7/2003 | Tamura et al. | |
| 2004/0007931 A1 | 1/2004 | Gorohata et al. | |
| 2006/0232157 A1* | 10/2006 | Ooiwa | H02K 9/06 310/201 |

FOREIGN PATENT DOCUMENTS

| | | |
|---|---|---|
| JP | 2003-219614 A | 7/2003 |
| JP | 2004-025303 A | 1/2004 |
| JP | 2004-032892 A | 1/2004 |
| JP | 2006-304436 A | 11/2006 |
| JP | 2007-089273 A | 4/2007 |
| JP | 2011198492 A | 10/2011 |

* cited by examiner

ROTARY ELECTRIC MACHINE AND STATOR MANUFACTURING METHOD

CROSS-REFERENCE TO RELATED APPLICATIONS

This is a national phase application based on the PCT International Patent Application No. PCT/JP2011/080432 filed on Dec. 28, 2011, the entire contents of which are incorporated herein by reference.

TECHNICAL FIELD

The present invention relates to a technique to produce a stator using a segment coil and more particularly to a technique to insert a segment coil in slots of a stator and then weld end portions of the segment coil to each other.

BACKGROUND ART

Recently, in more and more cases, drive motors are mounted in vehicles in view of environmental concerns. Those vehicle-mounted drive motors are demanded for small footprint due to limited mounting space. Further, those motors are requested to output high power in order to enhance drive performance of the vehicles. In particular, a hybrid car has to mount therein both an engine and a drive motor in an engine room and is subjected to severe space limitations.

To reduce the size and increase output power of both a motor and a rotary electric machine, it is conceived to increase electric current values supplied to a coil provided in a stator. However, this needs a sufficient cross sectional area of a coil used in a stator and thus the use of a coil made of a flat rectangular conductor has been proposed. One of methods of forming such a coil of a flat rectangular conductor employs a segment coil. This method is achieved by forming segments by bending a flat rectangular conductor into a nearly U shape, inserting these segments in slots of a stator core, and then welding the segments to each other on a lead side of the stator to form a coil.

Patent document 1 discloses a technique related to a winding joining method of a rotary electric machine. When lead sections placed at a coil end of a stator are to be welded, an intermediate holding member is inserted between a second open end and a third open end from a radially inner circumference side of the lead sections. On the other hand, a first radial restricting member is pressed against an innermost circumferential open end from the radial inside and a second radial restricting member is pressed against an outermost circumferential open end from the radial outside. In addition, voltage is supplied between a torch and the members and inert gas is supplied to the torch, generating arc discharge between the torch and the open ends, thereby welding the open ends adjacent in the radial direction to each other. This can enhance welding property.

Patent document 2 discloses a technique related to a stator coil with sequentially joined segments of a rotary electric machine, and a manufacturing method thereof. A gap between lead sections protruding from an end face of a stator core is narrow in a radial direction on an end face side but wide in a radial direction on a tip side. This can enhance a lamination factor in each stator while preventing undesirable mutual contact of mutually adjacent tip portions and slat portions of the end parts and deterioration of insulation resistance.

RELATED ART DOCUMENTS

Patent Documents

Patent Document 1: JP-A-2003-219614
Patent Document 2: JP-A-2004-32892

SUMMARY OF INVENTION

Problems to be Solved by the Invention

However, the problems mentioned below are conceivably caused in manufacturing a stator to be used a rotary electric machine by the technique disclosed in Patent document 1.

When the lead sections of the stator are to be welded by the technique described in Patent document 1, this technique could not address the increased number of flat rectangular conductors to be set in each slot. Further, when the technique described in Patent document 2 is used, this technique is effective in addressing the increased number of flat rectangular conductors to be set in each slot, but the size of the stator may become large. This results from expansion of the lead end parts in the radial direction. However, since the stator is demanded for reduced size and increased output power as mentioned above, an increased coil end of the stator is not preferable.

In a stator that includes segment coils, as the number of flat rectangular conductors to be set in each slot is increased, the number of weld points on the lead side is also increased. Accordingly, in order to enhance high output power of a stator including segment coils, an important purpose to be achieved is to enhance weldability. It is preferable that lead tip portions to be welded are equal in distance from the end face of the stator and are placed adjacently. On the other hand, the shape accuracy of the segment coil is unable to be increased in view of a manufacturing manner including bending. For improvement of weldability, it is effective to place the lead tip portions at a distance as shown in Patent document 2. However, this placement results in an increased size of the stator. This document also does not mention improving variations in position of lead tip portions to be welded, caused under the influence of the shape accuracy of the segment coils.

The present invention has been made to solve the above problems and has a purpose to provide a rotary electric machine capable of improving weldability of lead sections and achieving size reduction, and a method of manufacturing the rotary electric machine.

Means of Solving the Problems

To achieve the above purpose, one aspect of the invention provides the following characteristics.

(1) In a rotary electric machine comprising a stator including: a segment coil having a plurality of segments formed of a flat rectangular conductor subjected to bending; and a stator core having slots in which the segment coil is inserted, welded parts formed at tips of lead sections of the segment coil, the lead sections protruding out of an end face of the stator core and being twisted, include weld beads arranged in a radial direction of the stator, at least one of the weld beads having a long ellipsoidal shape that is long in a radial direction of the stator core, and an angle between a longitudinal direction of the long ellipsoidal shape and an axial direction of the stator core is smaller than 90 degrees on a core cross section including a central axis of the stator core.

(2) In the rotary electric machine described in (1), the long ellipsoidal weld beads formed at the welded parts so that longitudinal directions of the weld beads are arranged radially on a lead side of the stator core, and the long ellipsoidal weld beads arranged adjacently are aligned so that an axis of a first weld bead in the longitudinal direction and an axis of a second weld bead in the longitudinal direction are arranged in the same direction on a radial plane including a line passing the central axis of the stator core in which the first weld bead and the second weld bead are arranged, on the core cross section.

(3) In the rotary electric machine described in (2), of the long ellipsoidal weld beads, an outermost weld bead placed on an outermost circumference side of the stator core or an innermost weld bead placed on an innermost circumference side of the stator core is different in an orientation of the longitudinal direction on the radial plane from the other weld bead or beads.

To achieve the above purpose, a stator manufacturing method in another aspect of the invention provides the following characteristics.

(4) In a stator manufacturing method of manufacturing a stator, the method including: bending a flat rectangular conductor to form a plurality of segments; placing the segments to form a segment coil; inserting the segment coil in slots of a stator core; twisting lead sections of the segment coil protruding out of an end face of the stator core; and welding tips of the lead sections to each other, the tips of the lead sections are formed with weld beads having a long ellipsoidal shape that is long in a radial direction of the stator core, and an angle between a longitudinal direction of the long ellipsoidal shape and an axial direction of the stator core is formed to be smaller than 90 degrees on a core cross section including a central axis of the stator core.

(5) In the stator manufacturing method described in (4), the lead sections are twisted so that a first peeled portion of each lead section of the segments protruding out of the slots of the stator core and a second peeled portion placed adjacent to the first peeled portion are different in height, and the first peeled portion and the second peeled portion are welded to form a welded part.

(6) In the stator manufacturing method described in (4), the segment coil is formed so that a first peeled portion provided with a chamfer portion at the tip of each lead section of the segments and a second peeled portion placed adjacent to the first peeled portion are alternately arranged, the segment coil is inserted in the slots of the stator core, and then the first peeled portion and the second peeled portion are welded to each other, the second peeled portion being placed adjacent to the first peeled portion and opposite to a direction in which the chamfer portion of the first peeled portion is oriented.

(7) In the stator manufacturing method described in one of (4) to (6), the first peeled portion is placed on an inner circumferential side of the stator core more than the second peeled portion.

Effects of the Invention

The rotary electric machine in one aspect of the invention having the above characteristics can provide the following operations and advantageous effects.

The above aspect described in (1) is a rotary electric machine comprising a stator including: a segment coil having a plurality of segments formed of a flat rectangular conductor subjected to bending; and a stator core having slots in which the segment coil is inserted, wherein welded parts formed at tips of lead sections of the segment coil, the lead sections protruding out of an end face of the stator core and being twisted, include weld beads arranged in a radial direction of the stator, at least one of the weld beads having a long ellipsoidal shape that is long in a radial direction of the stator core, and an angle between a longitudinal direction of the long ellipsoidal shape and an axial direction of the stator core is smaller than 90 degrees on a core cross section including a central axis of the stator core. Specifically, each weld bead formed to bridge over the tips of the adjacent lead sections is formed in a long ellipsoidal shape.

This configuration can make the adjacent weld beads hard to contact with each other when the adjacent tips of the lead sections are welded to form the weld beads. The coil end section of the stator is desired to be compact in size in association with a demand for size reduction of a rotary electric machine. The lead sections are bent in a twisting process so that the lead tip portions are placed in close positions. However, a jig called a twisting ring to be used in this twisting process needs a little gap between the lead sections when it is to be inserted. If a short distance between the lead sections may cause contact between the weld beads, the lead sections have to be spaced at a predetermined distance.

In designing the end portions of the stator, it is necessary to minimize the size while ensuring a minimum distance between the weld beads. This case is predicated on forming the weld bead with a size falling within an intended range. However, when the stator is actually produced, the lead tip portions are likely to be irregular in height. It is found that this results in unstable shapes of the weld beads, which may interfere with each other. In particular, in a case where the adjacent weld beads formed as shown in FIG. 18 mentioned later flow to come close to each other while they are facing each other, which may cause contact with each other, it is difficult to provide an insulation creepage distance. Although the welded part is required for insulation after welding, it is inconvenient to stick an insulation matter to form insulation coating if the predetermined gap is not provided.

To improve this point, the heights of the adjacent lead tip portions to be welded are changed purposely to form the weld beads into a long ellipsoidal shape, thereby avoiding an unintended flow of the weld beads. Accordingly, it is no longer necessary to space the lead tip portions more than required and thus it is possible to contribute to size reduction of the stator and size reduction of the rotary electric machine.

In the above aspect described in (2), in the rotary electric machine set forth in (1), the long ellipsoidal weld beads formed at the welded parts so that longitudinal directions of the weld beads are arranged radially on a lead side of the stator core, and the long ellipsoidal weld beads arranged adjacently are aligned so that an axis of a first weld bead in the longitudinal direction and an axis of a second weld bead in the longitudinal direction are arranged in the same direction on a radial plane including a line passing the central axis of the stator core in which the first weld bead and the second weld bead are arranged, on the core cross section.

Since the longitudinal directions of the long ellipsoidal weld beads formed at the coil end section of the stator are arranged uniformly, it is possible to prevent interference of the adjacent long ellipsoidal weld beads. In the course of forming the weld beads by welding, the weld beads to be formed are under influence of the gravity, and thus, the center of gravity of each weld bead is apt to be put on a portion positioned on a lower side. This results in the tendency that a lower portion of each weld bead comes closer to another lead section. Accordingly, the adjacent long ellipsoidal weld beads may contact with each other when the weld beads approach in the direction to face each other. To avoid this situation, the heights of the lead sections are adjusted to aggressively form the weld beads so that the longitudinal directions of the ellipsoidal weld beads are oriented in the same direction. This makes it possible to further shorten the distance between the lead sections. The thus configuration can contribute to size reduction of the rotary electric machine.

In the above aspect described in (3), in the rotary electric machine set forth in (2), of the long ellipsoidal weld beads, an outermost weld bead placed on an outermost circumference side of the stator core or an innermost weld bead placed on an innermost circumference side of the stator core is different in an orientation of the longitudinal direction on the radial plane from the other weld bead or beads. To be concrete, for example, in the case where the axis of each ellipsoidal weld bead in the longitudinal direction is inclined at a predetermined angle from the stator-core axis side toward the outer circumference side of the stator core, that is, in the case where the ellipsoidal weld beads are formed in the shape being low on the inner circumferential side and high on the outer circumferential side, when a plurality of weld beads are arranged radially on a plane and only the outermost weld bead is shaped to be high on the inner circumferential side and low on the outer circumferential side, the ellipsoidal weld beads are directed to face each other, thereby avoiding interference between the ellipsoidal weld beads.

Specifically, the outermost weld bead positioned on the outermost circumference flows toward the outer circumference of the stator, while the ellipsoidal weld beads positioned more inside than the outermost weld bead flow toward the inner circumference of the stator. Thus, their interference is less caused. To the contrary, the same advantageous effects can be provided by another configuration that the ellipsoidal weld beads are arranged to ascend toward on the inner circumference side and descend toward the outer circumference side in accordance with the outermost weld bead, and only the innermost weld bead is inclined to be low on the inner circumference side and high on the outer circumference side. The thus configuration does not need to set the distance between the lead sections of the stator longer beyond necessity and thus can contribute to size reduction of the rotary electric machine.

The stator manufacturing method in the one aspect of the invention having the above configurations can provide the following operations and advantages effects.

The above aspect described in (4) is a stator manufacturing method of manufacturing a stator, the method including: bending a flat rectangular conductor to form a plurality of segments; placing the segments to form a segment coil; inserting the segment coil in slots of a stator core; twisting lead sections of the segment coil protruding out of an end face of the stator core; and welding tips of the lead sections to each other, wherein the tips of the lead sections are formed with weld beads having a long ellipsoidal shape that is long in a radial direction of the stator core, and an angle between a longitudinal direction of the long ellipsoidal shape and an axial direction of the stator core is formed to be smaller than 90 degrees on a core cross section including a central axis of the stator core.

Since the weld beads are purposely made into the long ellipsoidal shape, that is, a situation allowing the weld beads to flow in one direction in the process of forming the weld beads is aggressively generated, the distance between the lead tips does not need to be made longer beyond necessity. This can contribute to the equivalent effects to the rotary electric machine shown in (1), i.e., size reduction of the stator and size reduction of the rotary electric machine.

In the above aspect described in (5), in the stator manufacturing method set forth in (4), the lead sections are twisted so that a first peeled portion of each lead section of the segments protruding out of the slots of the stator core and a second peeled portion placed adjacent to the first peeled portion are different in height, and the first peeled portion and the second peeled portion are welded to form a welded part. Since the heights of the adjacent lead sections are designed to be different, for example, the first peeled portion is set higher than the second peeled portion, it is possible to make the weld beads slanting in the intended direction into the long ellipsoidal shape when the welded part is formed later. Accordingly, the interval between the lead sections of the stator does not need to be made longer beyond necessity, resulting in contribution to size reduction of the stator.

In the above aspect described in (6), in the stator manufacturing method set forth in (4), the segment coil is formed so that a first peeled portion provided with a chamfer portion at the tip of each lead section of the segments and a second peeled portion placed adjacent to the first peeled portion are alternately arranged, the segment coil is inserted in the slots of the stator core, and then the first peeled portion and the second peeled portion are welded to each other, the second peeled portion being placed adjacent to the first peeled portion and opposite to a direction in which the chamfer portion of the first peeled portion is oriented. The chamfer portion is provided at the tip portion of each segment. The first peeled portion including the chamfer portion and the second peeled portion including no chamfer portion are placed adjacently and welded to each other. This aggressively allows the weld beads to flow along the slant surfaces of the chamfer portions, thus enabling forming the ellipsoidal weld beads in the desired direction. Consequently, the interval between the lead sections of the stator does not need to be made longer beyond necessity, resulting in contribution to size reduction of the stator.

In the above aspect described in (7), in the stator manufacturing method set forth in one of (4) to (6), the first peeled portion is placed on an inner circumferential side of the stator core more than the second peeled portion. Accordingly, the stator is configured such that the long ellipsoidal weld beads placed adjacently are arranged so that the axes of the first weld bead and the adjacent second weld bead in the longitudinal direction are oriented in the same direction on a radial plane on which the first and second weld beads are arranged. Consequently, the interval between the lead sections of the stator does not need to be made longer beyond necessity, resulting in contribution to size reduction of the stator.

MODE FOR CARRYING OUT THE INVENTION

A detailed description of a first embodiment of the present invention will now be given referring to the accompanying drawings.

Figure 1:
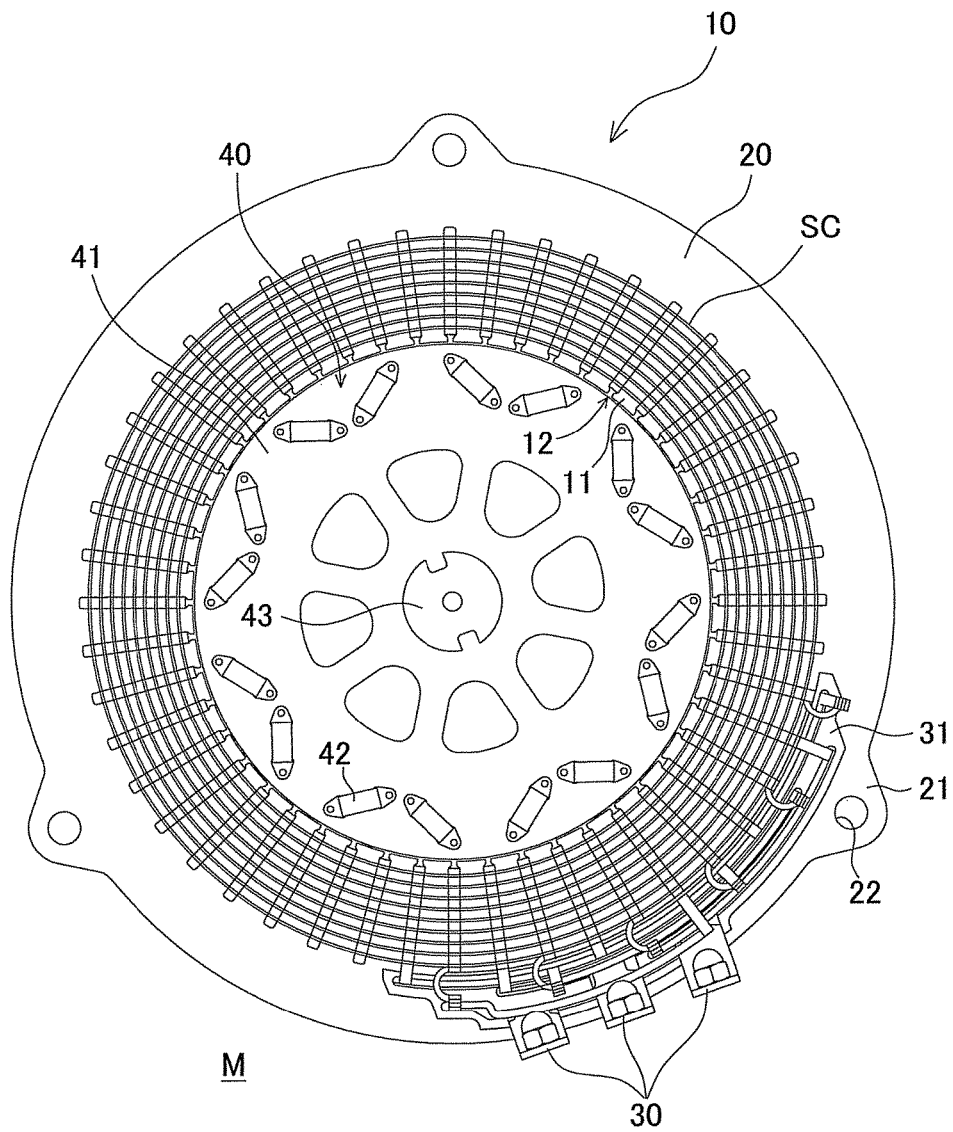
FIG. 1 is a plan view of a stator in a first embodiment.
Figure 2:
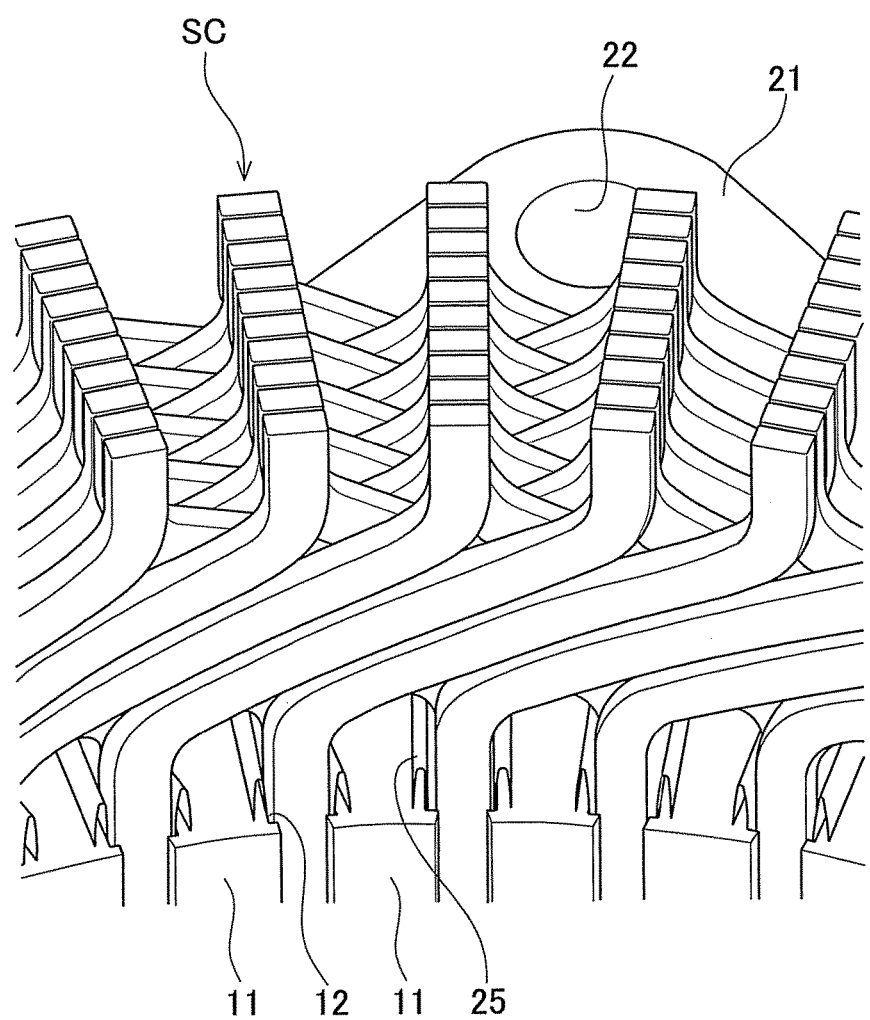
FIG. 2 is an enlarged perspective view of a coil end section on a lead side of a stator in the first embodiment.

FIG. 1 is a plan view of a rotary electric machine M in the first embodiment. FIG. 2 is an enlarged perspective view of a coil end section on a lead side of a stator 10. However, a rotor 40 is omitted from FIG. 2 for convenience of explanation. The stator 10 includes a stator core 20 and a segment coil SC. The stator core 20 made of electromagnetic steel sheets laminated into a nearly cylindrical shape is formed with teeth 11 each protruding on an inner circumferential side of the stator core 20 and slots 12 defined between adjacent teeth 11.

The number of the teeth 11 provided in the stator core 20 is 48. The number of the slots 12 provided herein is also 48. The outer edge of the stator core 20 has ribs 21 formed to protrude outward from the stator core 20 and bolt holes 22 provided one in each of the ribs 21. These bolt holes 22 are available for mounting a motor cover and others not shown to the stator 10.

Figure 3:
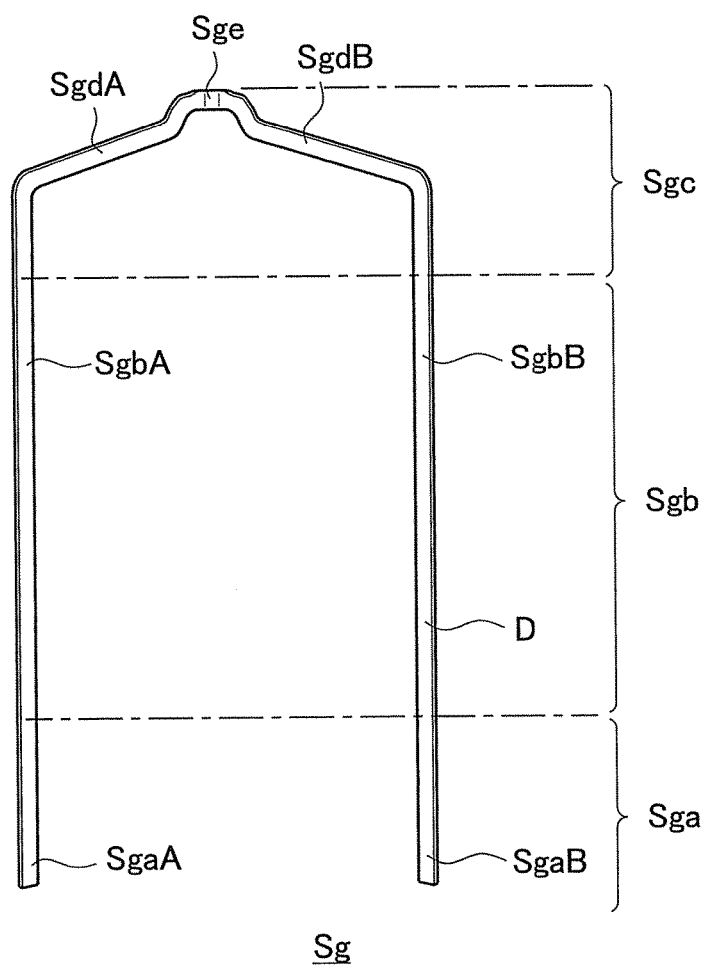
FIG. 3 is a plan view of a segment in the first embodiment.

In each of the slots 12, an insulating insulator 25 is inserted. The insulators 25 provide insulation between the segment coil SC and the stator core 20. FIG. 3 is a plan view of a segment Sg. This segment Sg is formed of a flat rectangular conductor D edgewise-bent into a nearly U shape. A plurality of kinds of segments Sg are prepared and arranged in a circle and then lead sections Sga are welded, forming the segment coil SC. In this description, however, a state where the lead sections Sga are not welded is also referred to as the segment coil SC for convenience of explanation.

Each segment Sg includes three sections, i.e., an in-slot wire section Sgb to be inserted in a slot 12 of the stator core 20, a lead section Sga protruding from an end face of the stator core 20 on a lead side of the stator 10, and a non-lead section Sgc. For convenience, the lead sections Sga are referred to as a lead section SgaA and a lead part SgaB distinctly. The in-slot wire sections Sgb are referred to as an in-slot wire section SgbA and an in-slot wire section SgbB. The non-lead section Sgc includes a crank portion Sge, a slant portion SgdA, and a slant portion SgdB. Even though not illustrated in FIGS. 2 and 3, the lead section SgaA and the lead part SgaB are provided, at their tips, with peeled (bare) portions Sgi formed by a peeling process mentioned later.

The rotary electric machine M includes a rotor 40 radially inside of the stator 10. The rotor 40 includes a lamination stack 41 formed of a plurality of laminated electromagnetic steel sheets not shown and a number of permanent magnet pieces 42 arranged in the lamination stack 41. The rotor 40 is provided, at its center, with a shaft 43 which is coupled to the lamination stack 41. A gap is provided between the stator 10 and the rotor 40, but this gap is preferred to be as small as possible. The gap is however considered to include a tolerance to the degree of not causing interference with the inner circumferential surface of the stator 10 during rotation of the rotor 40.

Figure 4:
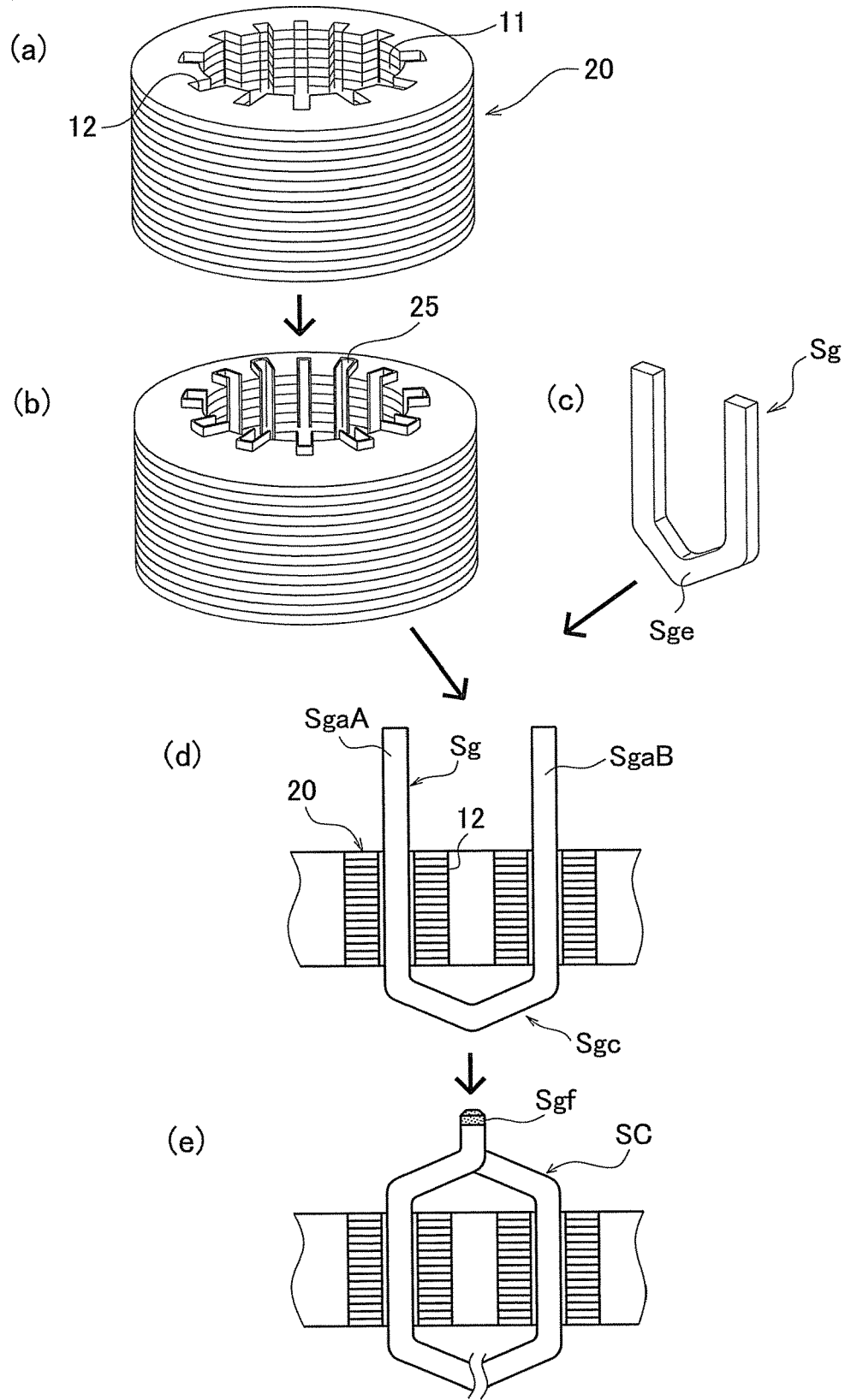
FIG. 4 is a schematic view showing an assembling process of the stator, (a) showing a schematic perspective view of a stator core, (b) showing a schematic perspective view illustrating the stator core provided with insulators, (c) showing a schematic perspective view of the segment, (d) showing a schematic cross sectional view illustrating the segment inserted in the stator core, and (e) showing a schematic cross sectional view illustrating the segments welded.

FIG. 4 schematically shows an assembling process of the stator 10; FIG. 4(a) is a perspective view of the stator core 20, FIG. 4(b) is a perspective view of the stator core 20 provided with the insulators 25, FIG. 4(c) is a perspective view of the segment Sg, FIG. 4(d) is a cross sectional view showing a state where the segment Sg is inserted in the stator core 20, and FIG. 4(e) is a cross sectional view showing a state where the segment Sg is welded to another. The perspective views in FIG. 4 illustrate the simplified shapes for explanation. While the insulators 25 are inserted as shown in FIG. 4(b) in the slots 12 formed in the stator core 20 shown in FIG. 4(a), the segments Sg shown in FIG. 4(c) are further inserted in the slots 12.

This results in a state shown in FIG. 4(d). Specifically, part of each segment Sg protrudes from the end of the stator core 20 so that the lead sections SgaA and the lead parts SgaB protrude out. These lead sections SgaA and lead parts SgaB are twisted and their tips are welded to those of other segments Sg as shown in FIG. 4(e), forming a weld bead Sgf. The above conceptual explanation referring to FIG. 4 is given to the process of forming the stator 10. In an actual assembling process, however, an arrangement process is required to arrange the segments Sg in an annular form between a process of FIG. 4(c) and FIG. 4(d).

Figure 5:
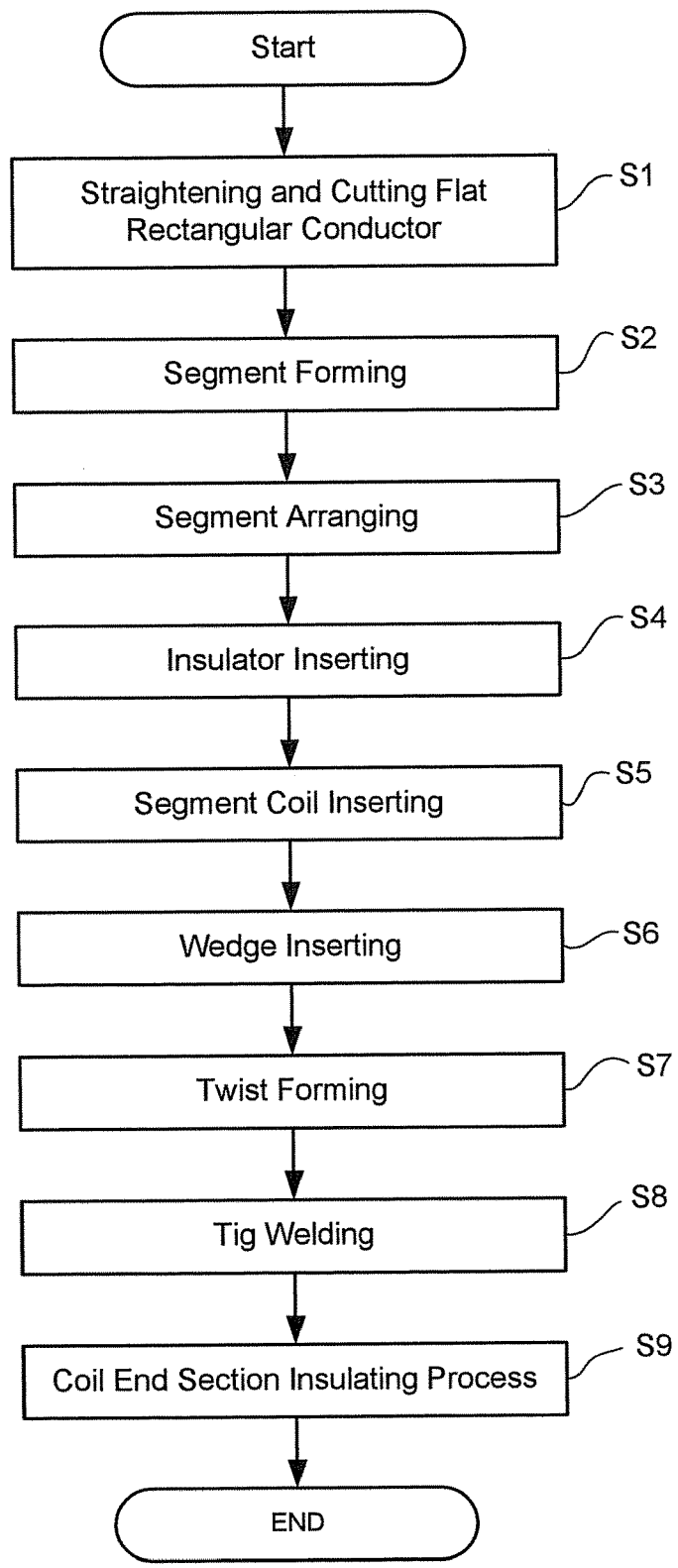
FIG. 5 is a flow showing an assembling process of the stator in the first embodiment.

FIG. 5 is a flow of an assembling process of the stator 10. In S1, "Straightening and Cutting Flat rectangular conductor" is performed. Since the flat rectangular conductor D is wound on a bobbin not shown, the conductor D is reeled out, subjected to straightening, and then cut out by a necessary length. In S2, "Segment Forming" is performed. The flat rectangular conductor D is edgewise-bent and further a crank portion Sge is made by use of a die not shown to produce a nearly U-shaped segment Sg. In S3, "Segment Arranging" is performed. The segments Sg are arranged in a cylindrical form by combining the crank portions Sge of the segments Sg so that ten in-slot wire sections SgbA or in-slot wire sections SgbB are set in each slot 12 of the stator core 20. The segment coil SC is thus produced.

In S4, "Insulator Inserting" is performed. In the slots 12 of the stator core 20, the insulators 25 are provided in order to ensure insulation between the stator core 20 and the segment coil SC. In this process, the insulators 25 are inserted and positioned in the slots 12. In S5, "Segment Coil Inserting" is performed. Strictly speaking, this process is a step of placing the segment coil SC close to the stator core 20 and inserting the lead sections Sga in the slots 12 provided with the insulators 25.

Figure 6:
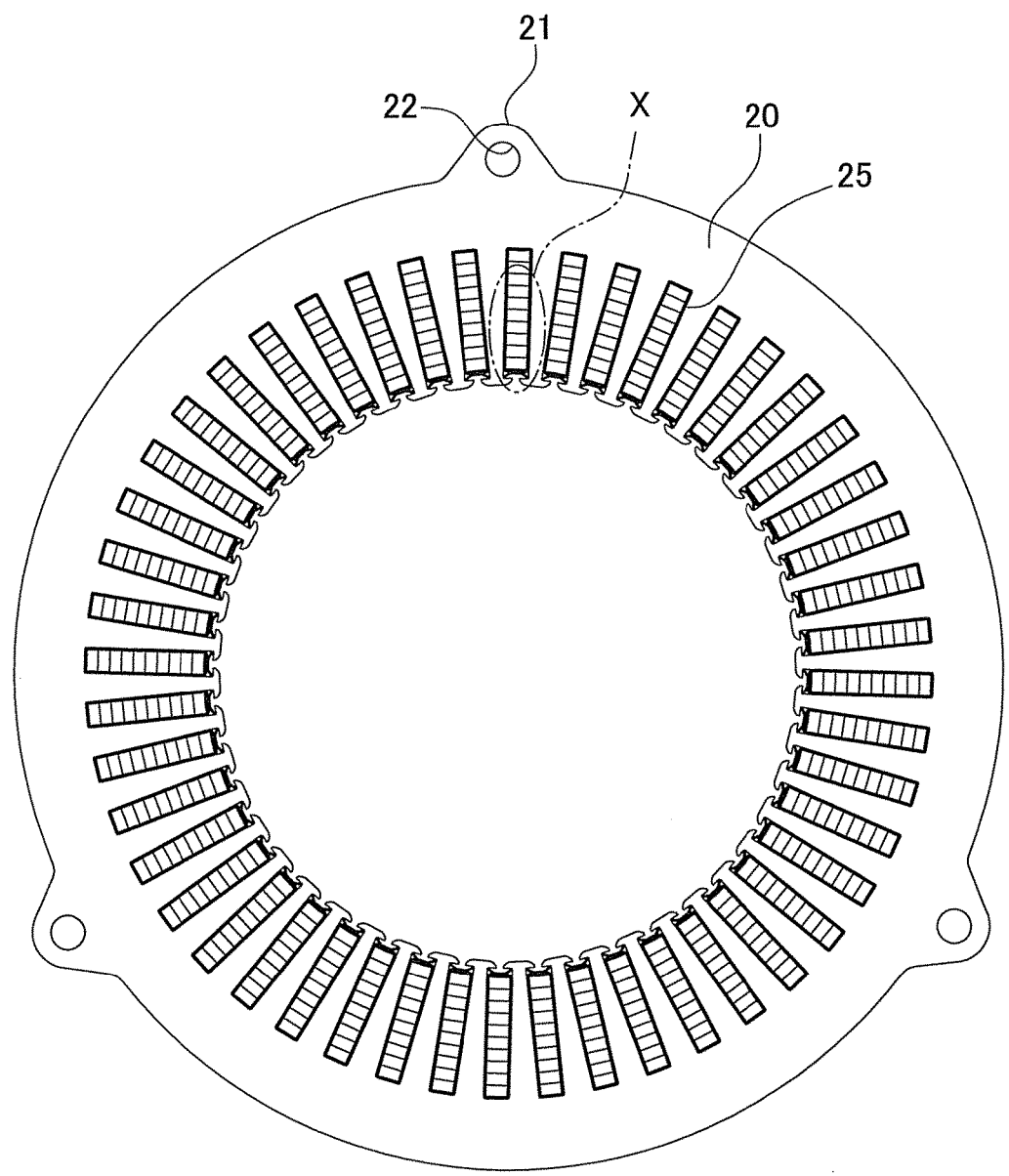
FIG. 6 is a cross sectional view of the stator core in which in-slot wire sections are set in slots in the first embodiment.
Figure 7:
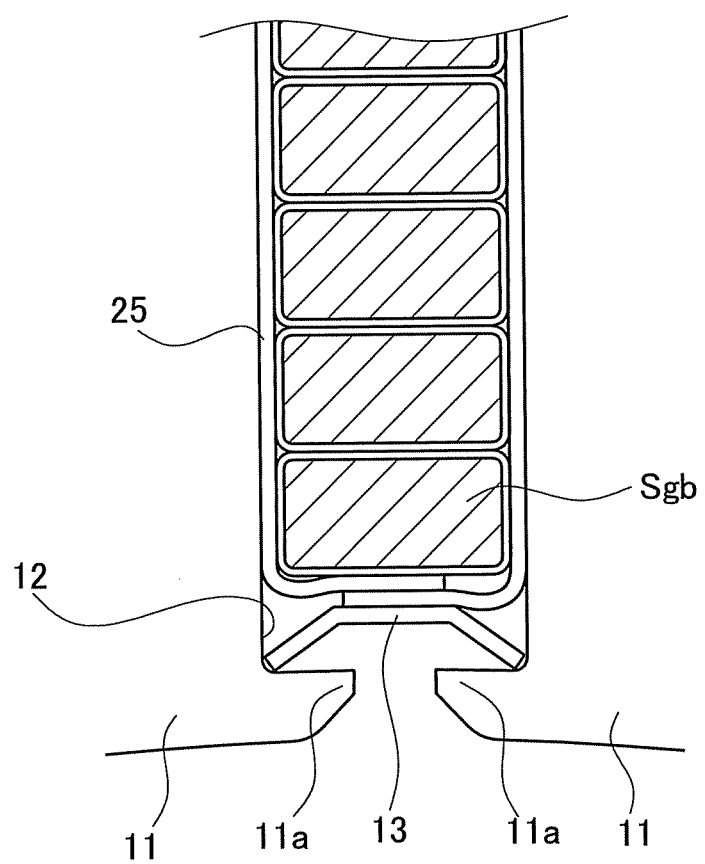
FIG. 7 is an enlarged cross sectional view of a part of the stator core corresponding to a slot in which the in-slot wire sections are set in the first embodiment.

In S6, "Wedge Inserting" is performed. FIG. 6 is a cross sectional view showing a state where the in-slot wire sections Sgb are set in the slots 12 of the stator core 20. FIG. 7 is an enlarged cross sectional view of a part of the stator core 20 corresponding to a slot 12 in which the in-slot wire sections Sgb are set. FIG. 7 corresponds to an enlarged view of a part X in FIG. 6. While ten in-slot wire sections Sgb of the segments Sg are inserted in the slots 12, the wedge paper 13 is inserted on an innermost circumferential side of the stator core 20. The wedge paper 13 is held in a pushed state by protrusions 11a provided at a tip of the teeth 11 so as to protrude in each slot 12.

In S7, "Twist Forming" is performed. The lead sections Sga of the segment coil SC inserted in the stator core 20 are twisted in a radial direction of the stator core 20 and deformed to connect to each other between adjacent ones. A twisting direction of the lead sections Sga is determined so that the lead sections Sga adjacent in the radial direction are twisted in different direction as shown in FIG. 2. In S8, "Tig Welding" is performed. As shown in FIG. 4(e), the adjacent lead sections Sga are welded to each other, forming a weld bead Sgf. At that time, the lead sections Sga are also welded to a terminal block 31 provided with external connecting terminals 30 shown in FIG. 1. In S9, "Coil End Section Insulating Process" is performed. This is a step of applying an insulation coating to the weld beads Sgf by using resin by powder coating. The segment coil SC assembled in the stator core 20 is impregnated with varnish.

Figure 8:
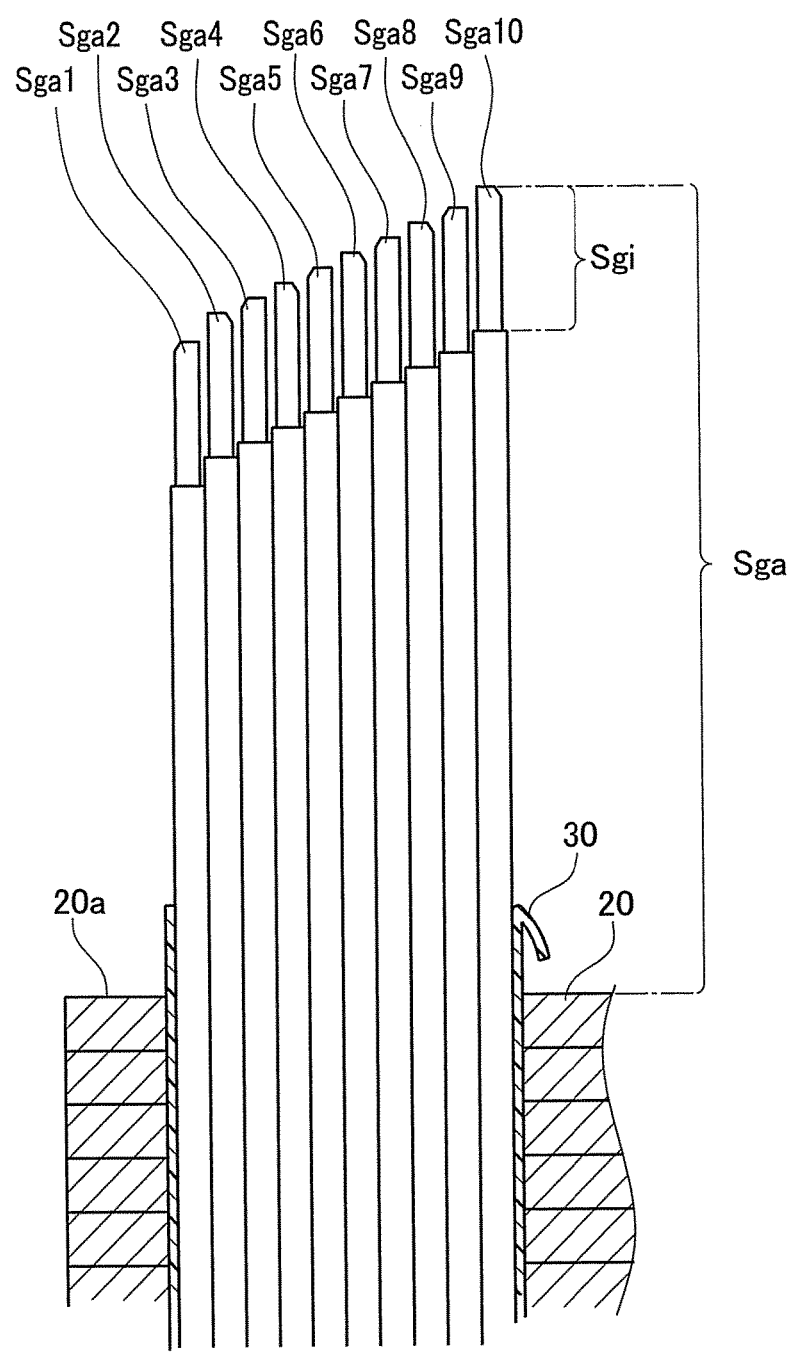
FIG. 8 is an enlarged cross sectional view of a coil end section before a twisting process in the first embodiment.

FIG. 8 is an enlarged cross sectional view of the coil end section before the twisting process. The segment coil SC (an open end side of the segments Sg arranged in the annular form) is first inserted in the stator core 20, allowing the lead sections Sga protrude from the end face of the stator core 20 in a state shown in FIG. 8. The lead sections Sga arranged are referred to, from the inner circumferential side, as a first lead section Sga1, a second lead section Sga2, a third lead section Sga3, a fourth lead section Sga4, a fifth lead section Sga5, a sixth lead section Sga6, a seventh lead section Sga7, an eighth lead section Sga8, a ninth lead section Sga9, and a tenth lead section Sga10. These lead sections are designed with different lengths from an end face 20a of the stator core 20 so that the lengths are longer in the order from the first lead section Sga1 to the tenth lead section Sga10.

Figure 9:
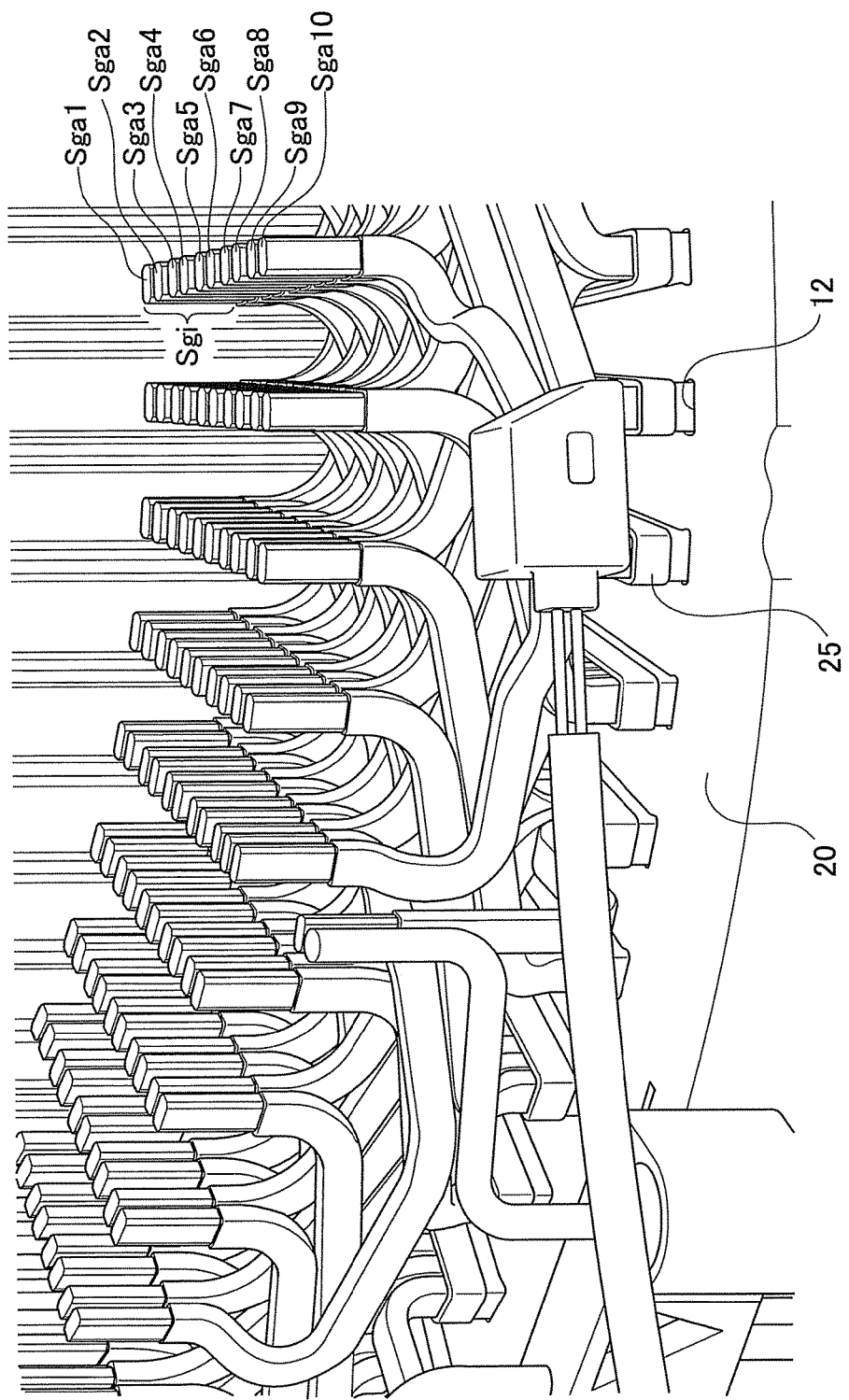
FIG. 9 is an enlarged perspective view of the coil end section of the stator after twisting in the embodiment.
Figure 10:
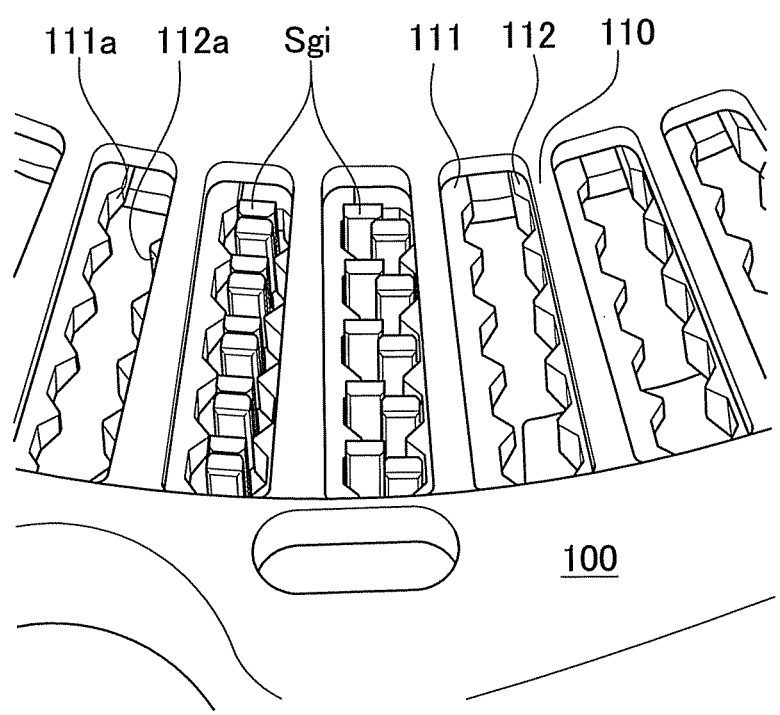
FIG. 10 is a perspective view of a welding jig in the first embodiment.
Figure 11:
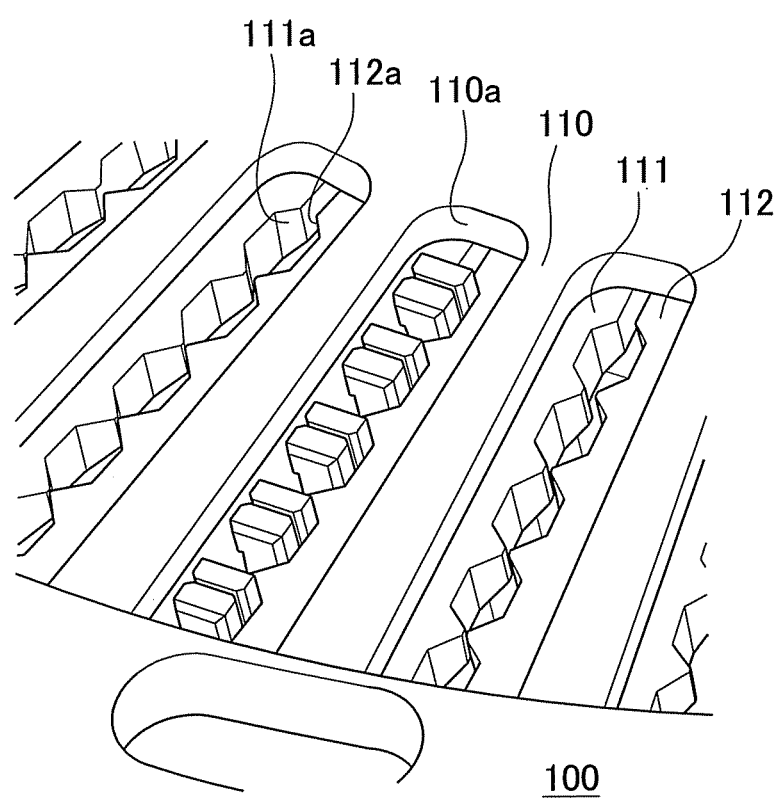
FIG. 11 is a perspective view showing a state where the welding jig clamps peeled portions in the first embodiment.

FIG. 9 is an enlarged perspective view of the coil end section of the stator 10 after the twisting process. The perspective view of FIG. 2 illustrates the stator 10 seen from the inner circumferential side, while the perspective view of FIG. 9 illustrates the stator 10 seen from the outer circumferential side. The lead section Sga is twisted from a state shown in FIG. 8 to a state shown in FIG. 2 or 9 by passing through a twisting process in S7. In this state, "Tig Welding" in S8 is conducted. FIG. 10 is a perspective view of a welding jig 100. FIG. 11 is a perspective view showing a state in which the peeled portions Sgi are clamped by the welding jig 100. It is to be noted that the peeled portions Sgi which are unnecessary in explanation are omitted from FIG. 11. The welding jig 100 includes a plate 110 having gates 110a radially arranged in positions corresponding to the slots 12 of the stator core 20, and further a fixing-side clamp 111 and a moving-side clamp 112 in each gate 110a.

The fixing-side clamps 11 and the moving-side clamps 112 function to position the peeled portions Sgi so as to enable Tig welding and hold them in predetermined positions and also they are grounded during Tig welding to function to protect the stator from spatters and contribute to cooling of the weld beads Sgf. The peeled portions Sgi of the lead section Sga are clamped by the fixing-side clamps 111 and the moving-side clamps 112 as shown in FIGS. 10 and 11. To be concrete, the welding jig 100 is placed so that the peeled portions Sgi protrude between the fixing-side clamps 111 and the moving-side clamps 112, and thereafter the moving-side clamps 112 are moved to clamp the peeled portions Sgi provided at the tips of the lead sections Sga.

The surfaces of the fixing-side clamps 111 and the surfaces of the moving-side clamps 112 which will contact with the peeled portions Sgi are respectively provided with tapers 111a and 112a in order to guide the peeled portions Sgi. Accordingly, the peeled portions Sgi are centered, even though with slight variations, and thus clamped between and positioned in place by the fixing-side clamps 111 and the moving-side clamps 112. Thereafter, the adjacent peeled portions Sgi are joined to each other by Tig welding using an electrode not shown.

Figure 12:
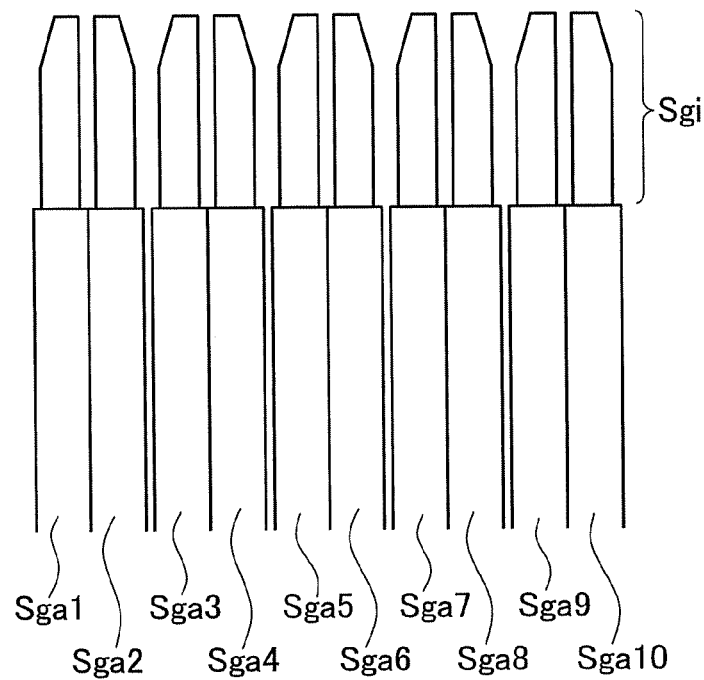
FIG. 12 is a side view of tip portions of lead sections after the twisting in the first embodiment.
Figure 13:
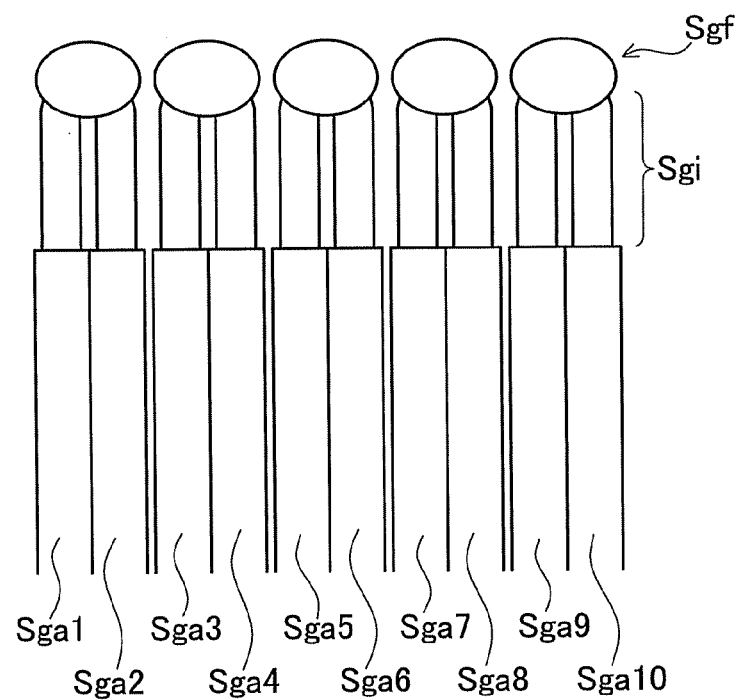
FIG. 13 is a side view of the tip portions of the lead sections after welding in the first embodiment.

FIG. 12 is a side view of tip portions of the lead sections Sga after subjected to the twisting process. FIG. 13 is a side view of the tip portions of the lead sections Sga after subjected to welding. The welding jig 100 is not illustrated in FIGS. 12 and 13, but it is actually placed in a chucking state during welding. FIGS. 12 and 13 show an ideal state in which the segments Sg are arranged uniformly with each other. These FIGS. 12 and 13, even though not showing cross sectional views, do show the plane passing the central axis of the stator core 20 and corresponding to a core cross section taken along the center of one slot 12 and to a radiation plane. In the above manner, the peeled portions Sgi of the lead sections Sga are welded to form weld beads Sgf at the tips of the peeled portions Sgi. Since Tig welding is conducted by melting a base material, the adjacent peeled portions Sgi are melted and electrically joined to each other. This state in FIG. 13 is a schematically illustrated ideal state, but the heights of the lead sections Sga are different in an actual state for the reason which will be mentioned later.

Figure 14:
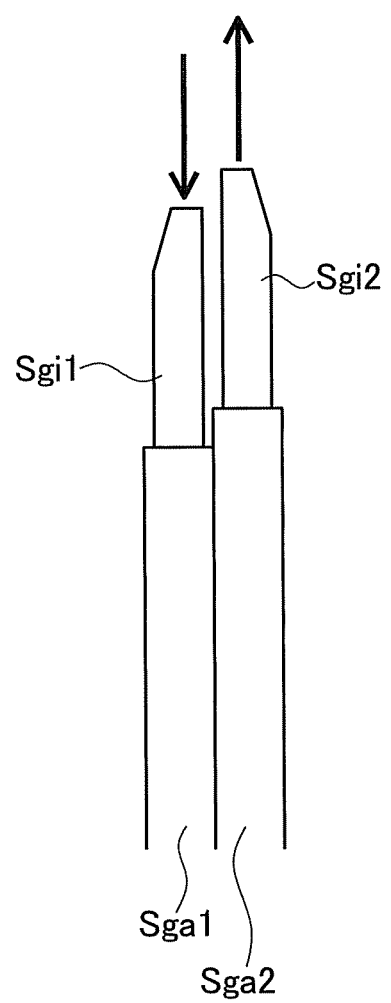
FIG. 14 is a side view showing part of the lead sections in the first embodiment.
Figure 15:
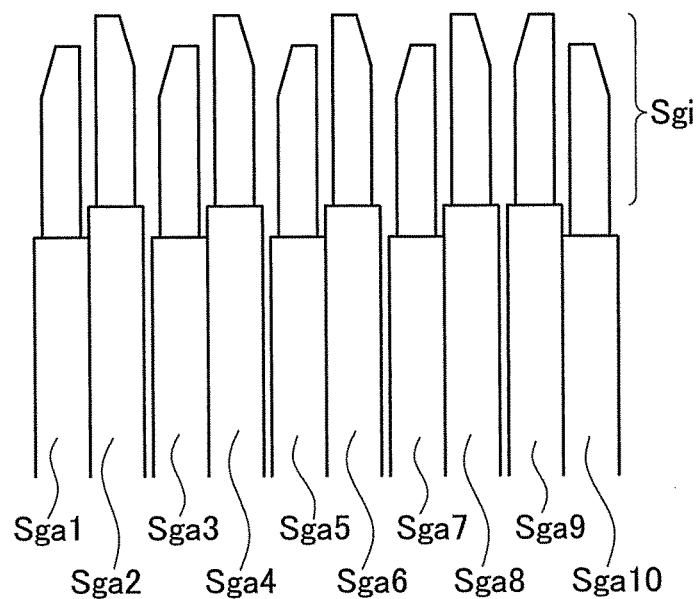
FIG. 15 is a side view of tip portions of lead sections having different heights in the first embodiment.
Figure 16:
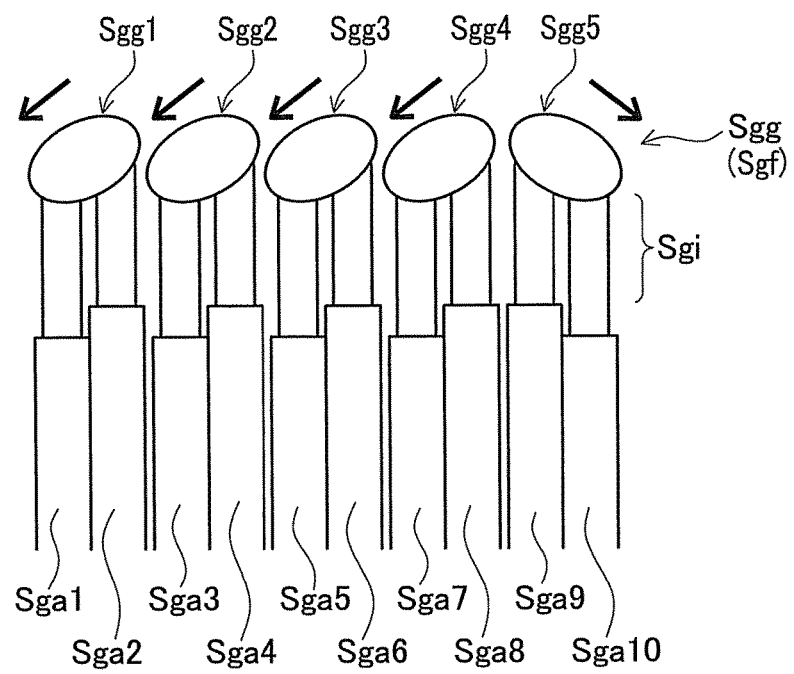
FIG. 16 is a side view of the welded tip portions of the lead sections having different heights in the first embodiment.

FIG. 14 is a side view showing part of the lead sections Sga. FIG. 15 is a side view of the tip portions of the lead sections Sga provided to be different in height. FIG. 16 is a side view of the welded tip portions of the lead sections Sga having different heights. In the aforementioned twisting process, as shown in FIG. 14, in the case of the first lead section Sga1 and the second lead section Sga2, for example, they are twisted so that a first peeled portion Sgi1 of the first lead section Sga1 is lower than a second peeled portion Sgi2 of the second lead section Sga2. Preferably, this is set so that ones of the paired lead sections Sga shown in FIGS. 12 and 13, the ones being positioned on the inner circumferential side, are lower than the others. To be concrete, it is preferable to twist the first, third, fifth, and seventh lead sections Sga1, Sga3, Sga5, and Sga7 so as to be lower than respective adjacent lead sections Sga. Only a ninth lead section Sga9 is set so that the tenth lead section Sga10 is lower than the ninth lead section Sga9, and they are welded to each other.

As above, the peeled portions Sgi are welded to each other to form the weld beads Sgf, which are referred in FIG. 16 as to a first ellipsoidal weld bead Sgg1 to a fifth ellipsoidal weld bead Sgg5 for distinction from the weld beads Sgf. It is shown that the first ellipsoidal weld bead Sgg1 to the fourth ellipsoidal weld bead Sgg4 are arranged in nearly parallel in their longitudinal direction. Specifically, on a core cross section formed by the drawing sheet of FIG. 16, the first ellipsoidal weld bead Sgg1 to the fourth ellipsoidal weld bead Sgg4 are uniformly arranged to be oriented in the same direction. The ellipsoidal weld beads Sgg are weld beads Sgf formed in an ellipsoidal shape, not in an approximate perfect spherical shape like the weld beads Sgf normally formed by welding. Although the weld beads Sgf unintentionally formed in an ellipsoidal shape are present, they are referred to as an ellipsoidal weld bead Sgg for distinction in the present embodiment. As a result of Tig welding of the lead sections Sga, the coil end sections shown in FIGS. 2 and 9 are formed. The rotor 40 shown in FIG. 1 is thereafter mounted and thus the rotary electric machine M is completed.

The stator 10 in the first embodiment is configured as above and produced through the aforementioned forming processes and thus can provide the following operations and advantageous effects.

As the advantageous effects, weldability of the coil end section of the stator 10 can be improved and also the stator 10 can be designed in a reduced size.

The rotary electric machine M in the first embodiment includes the stator 10 including the segment coil SC made by bending the flat rectangular conductor D and the stator core 20 having the slots 12 in which the segment coil SC is inserted. In this rotary electric machine M, the tip portions of the lead sections Sga of the segment coil SC, protruded from and twisted above the end face of the stator core 20, are formed with the welded parts in the form of the weld beads Sgf arranged in the radial direction of the stator 10, at least one of which has a long ellipsoidal shape that is long in the radial direction of the stator core 20 so that the angle between the longitudinal direction of the long ellipsoidal shape and the axial direction of the stator core 20 is smaller than 90 degrees. Specifically, the weld beads Sgf formed to bridge the tips of the adjacent lead sections are formed in a long ellipsoid.

At the coil end of the stator 10, as shown in FIG. 16, the weld beads formed in the lead sections Sga from the first lead section Sga1 to the eighth lead section Sga8 are weld beads Sgg slanting toward the inner circumferential side of the stator 10. The fifth ellipsoidal weld bead Sgg5 formed by welding the ninth lead section Sga9 and the tenth lead section Sga10 is slanting to be lower on the outer circumferential side.

At the stator 10, alternatively, even though not illustrated, one of the first ellipsoidal weld bead Sgg1 to fourth ellipsoidal weld bead Sgg4, or the fifth ellipsoidal weld bead Sgg5 is formed like the weld beads Sgf shown in FIG. 13. In a case where the segment coil SC is inserted in the stator core 20, as explained above, it is difficult to uniformly arrange or align the positions the tips of the lead sections Sga due to various factors. One reason is that each segment Sg is made by subjecting the flat rectangular conductor D to a bending process such as edgewise bending and thus the shape accuracy of the segment Sg is less likely to be obtained. Further, positioning of the segments Sg is hard due to the characteristics of the shapes of the segments Sg. Another conceivable reason is in variations in the tip positions of the lead sections Sga resulting from the assembling process of the stator 10. From the above reasons, the tip positions of the lead sections Sga are difficult to accurately arrange in a single horizontal row as shown in FIG. 12.

Figure 17:
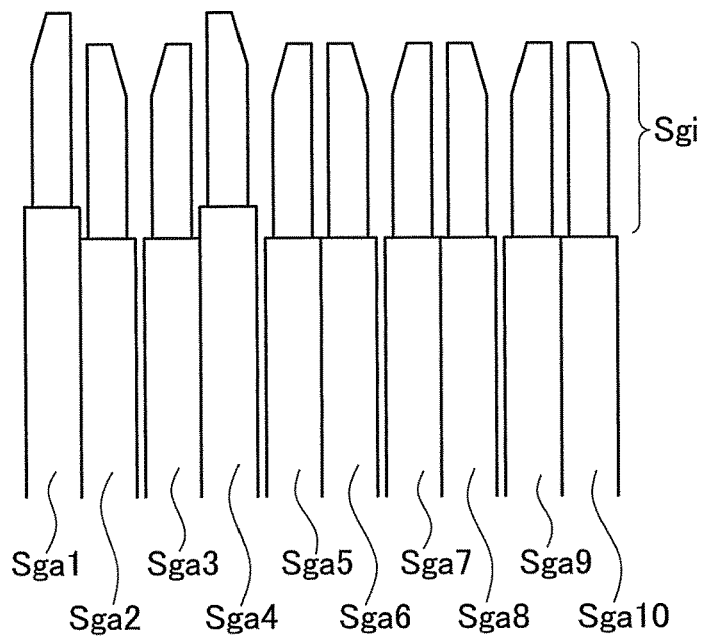
FIG. 17 is a side view of tip portions of lead sections having different heights illustrated as a comparative example with respect to the first embodiment.
Figure 18:
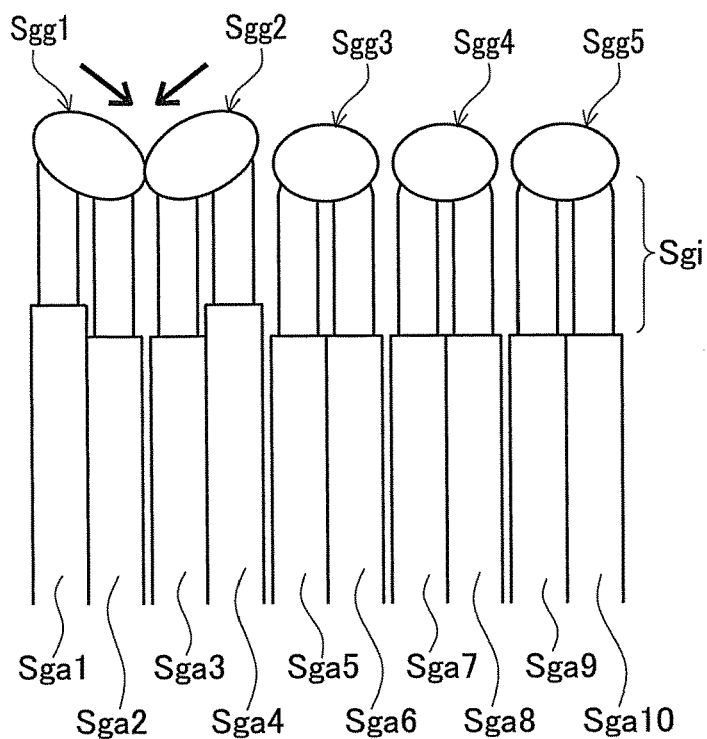
FIG. 18 is a side view of the tip portions of the lead sections having different heights illustrated as the comparative example with respect to the first embodiment.

FIG. 17 is a side view showing a comparative example in which the tip portions of the lead sections are irregular. FIG. 18 is a side view showing the comparative example in which the lead tip portions are irregular. FIGS. 17 and 18 show a situation where the lead sections Sga are non-uniformly arranged. To be concrete, the first lead section Sga1 and the fourth lead section Sga4 protrude higher than the second lead section Sga2 and the third lead section Sga3. When the lead sections Sga are welded to each other in this state, as shown in FIG. 18, the first ellipsoidal weld bead Sgg1 and the second ellipsoidal weld bead Sgg2 come close to each other in a direction that they approach each other while the first ellipsoidal weld bead Sgg1 and the second ellipsoidal weld bead Sgg2 are facing each other. This may result in contact and conduction of the second lead section Sga2 and the third lead section Sga3 according to a distance between them.

To avoid the above situation, when the stator 10 in the first embodiment is to be manufactured, the lead sections Sga are twisted to provide such a layout as shown in FIG. 15 in the twisting process of the lead sections Sga. Alternatively, an adjustment process may be provided to adjust the tip positions after the twisting process. In either case, the lead sections Sga are formed so that the first lead section Sga1 is lower than the second lead section Sga2, and the third lead section Sga3 is lower than the fourth lead section Sga4, the fifth lead section Sga5 is lower than the sixth lead section Sga6, the seventh lead section Sga7 is lower than the eighth lead section Sga8, and the ninth lead section Sga9 is lower than the tenth lead section Sga10. Thereafter, welding is conducted to form the state shown in FIG. 16 or form part thereof as the spherical weld beads Sgf. The weld beads Sgf are not formed in such a manner that the ellipsoidal weld beads Sgg shown in FIG. 18 come close to each other. Thus, it is possible to suppress the occurrence of failures during welding of the lead sections Sga.

Since the weld beads Sgf are formed as above, there is no need to set the distance between the lead sections Sga longer as needed. This can minimize the distance between the lead sections Sga, enabling production of a compact coil end section of the stator 10. Accordingly, this can contribute to size reduction of the stator 10.

Next, a second embodiment of the invention will be explained referring to drawings. The second embodiment is almost identical in configuration to the stator 10 of the first embodiment, excepting setting of heights of the lead sections Sga. The following explanation is given to this difference by use of the drawings.

Figure 19:
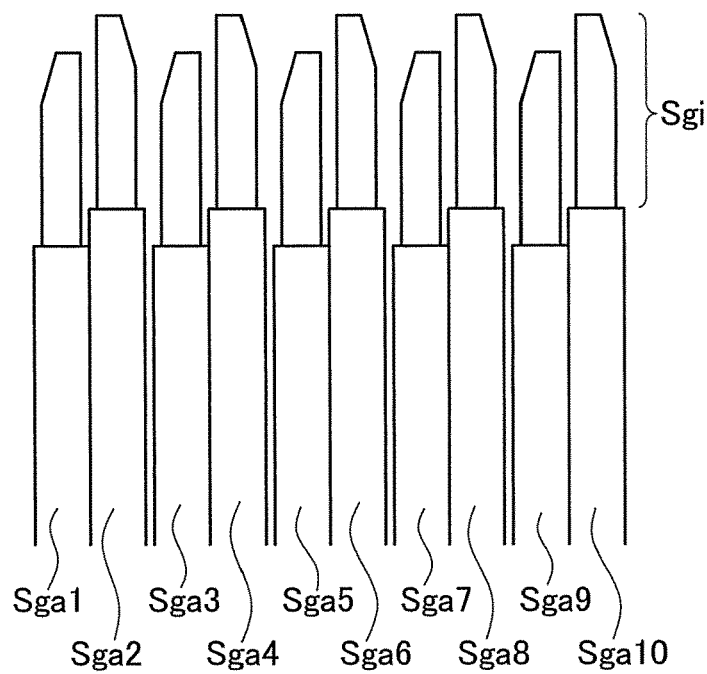
FIG. 19 is a side view of tip portions of lead sections having different heights in a second embodiment.
Figure 20:
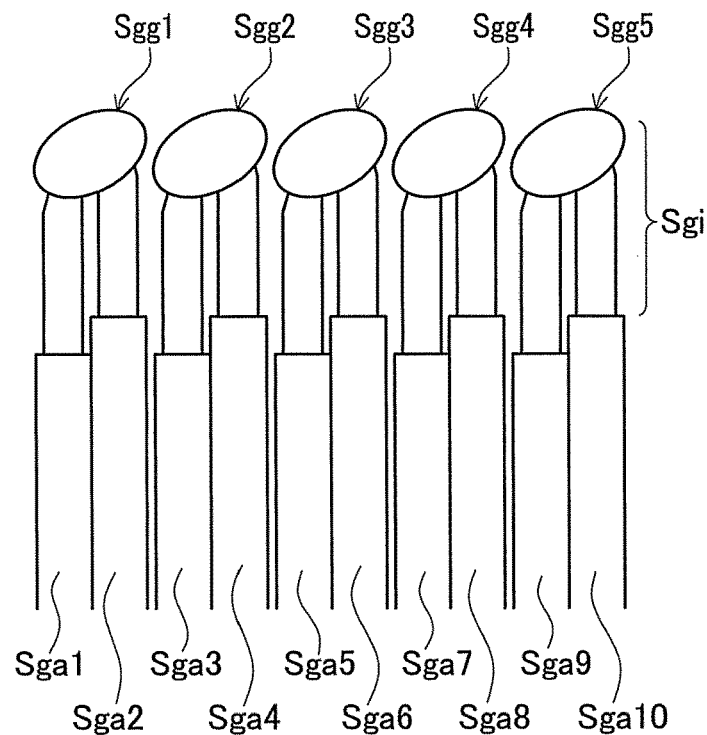
FIG. 20 is a side view of the tip portions of the lead sections having different heights in the second embodiment.

FIG. 19 is a side view of tip portions of the lead sections Sga having different heights in the second embodiment. FIG. 20 is a side view showing the welded tip portions of the lead sections Sga having different heights. The difference from the first embodiment is in setting the even-numbered lead sections Sga arranged radially outward in the stator 10, that is, the second lead section Sga2, the fourth lead section Sga4, the sixth lead section Sga6, the eighth lead section Sga8, and the tenth lead section Sga10 so as to be higher than respective adjacent lead sections Sga.

This difference in height between the lead sections Sga is achieved by adjusting the lengths of the segments Sg. Specifically, the lengths of the segments Sg are set so that the length of the second lead section Sga2 protrudes longer out of the end face of the stator core 20 than the first lead section Sga1. The segments Sg have different lengths according to respective inserting positions in the stator core 20. Thus, a manufacturing cost is hardly changed even if the length is changed. It is to be noted that there may be provided a method of adjusting the height in the twisting process and a process of adjusting the height after twisting as in the first embodiment.

The stator 10 in the second embodiment is configured as above and can provide the equivalent advantages to those obtained by the stator 10 in the first embodiment. Specifically, it is possible to ensure a reduction in the rate of defectives after Tig welding, and reduce the size of the coil end of the stator 10, thus contributing to a reduction of the size of the stator 10 itself.

Next, a third embodiment of the invention will be explained referring to drawings. The third embodiment is almost identical in configuration to the stator 10 of the first embodiment, excepting the shape of each tip of the lead section Sga. The following explanation is given to this difference by use of the drawings.

Figure 21:
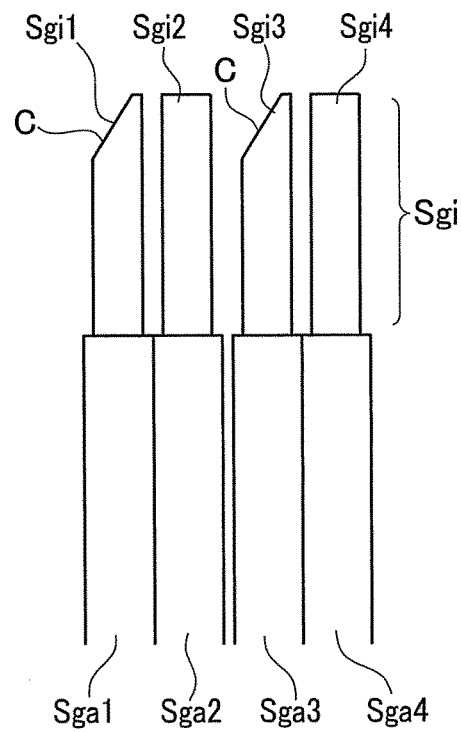
FIG. 21 is a side view of tip portions of lead sections in a third embodiment.
Figure 22:
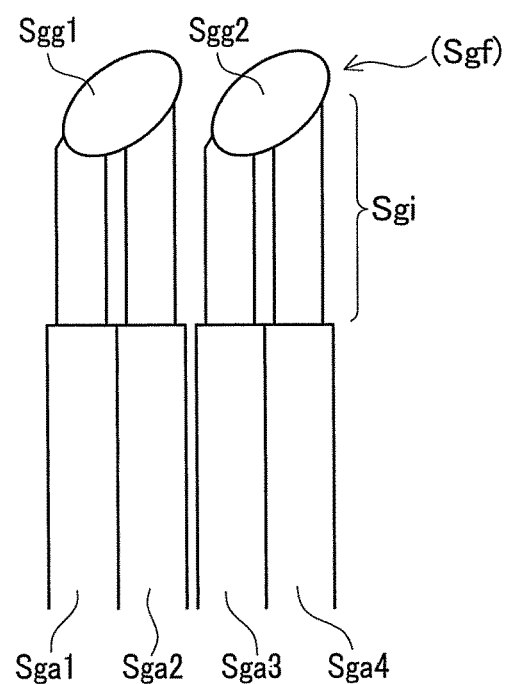
FIG. 22 is a side view of the welded tip portions of the lead sections in the third embodiment.

FIG. 21 is a side view of tip portions of the lead sections Sga in the third embodiment. FIG. 22 is a side view showing the welded tip portions of the lead sections Sga. It is to be noted that the lead sections Sga shown in FIGS. 21 and 22 are illustrated by four located on the inner circumferential side of the stator 10, and remaining lead sections are omitted. In the third embodiment, different from the first embodiment, the shapes of the lead sections Sga of the segments Sg have different shapes from adjacent lead sections Sga. As shown in FIG. 21, a first peeled portion Sgi1 of the first lead section Sga1 and a third peeled portion Sgi3 of the third lead section Sga3 are provided with slant surfaces C at respective tips.

These slant surfaces C are provided in the odd-numbered lead sections Sga of the segments Sg to be inserted in the slots 12 of the stator core 20, that is, the first lead section Sga1, the third lead section Sga3, the fifth lead section Sga5, the seventh lead section Sga7, and the ninth lead section Sga9. As an alternative, it may be arranged so that the ninth lead section Sga9 is not provided with the slant surface C, while the tenth lead section Sga10 is provided with the slant surface C slanting toward the outer circumference of the stator 10.

With such a configuration, the first ellipsoidal weld bead Sgg1 and the second ellipsoidal weld bead Sgg2 are formed as shown in FIG. 22 when the peeled portions Sgi are subjected to Tig welding. By providing the slant surfaces C, the weld beads Sgf aggressively formed by Tig welding flow along the direction of slanting of the slant surfaces C, that is, flow toward the inner circumference of the stator 10, resulting in the weld beads Sgf formed in ellipsoidal shape like the ellipsoidal weld beads Sgg. This can suppress the interference between the weld beads Sgf.

By using the above segments Sg, it is easy to move the ellipsoidal weld beads Sgg along the slanting direction of the slant surface C even in the case where the tip positions of the lead sections Sga are irregular as shown in FIG. 17, for example. Consequently, it is expected to avoid the weld beads Sgf from being formed so as to come close to each other as shown in FIG. 18. As with the stators 10 in the first and second embodiments, therefore, the present embodiment can reduce the rate of defectives after the weld beads Sgf are formed and hence contribute to size reduction of the stator 10. The first and second embodiments take the configuration that the heights of the lead sections Sga are made different aggressively, but the third embodiment targets on the equivalent advantages by devising the shapes of the tip portions of the lead sections Sga.

The present invention is explained in the above embodiments, but it is not limited to the above embodiments. The invention may be partially embodied in other specific forms without departing from the essential characteristics thereof. For instance, as well as the patterns shown in the first and second embodiments, the heights of the tip portions of the lead sections Sga may be made different so as to provide a combination capable of avoiding the weld beads Sgf from coming close to each other as shown in FIG. 18. For instance, the heights of the odd-numbered lead sections Sga are made uniform to be higher than the heights of the even-numbered lead sections Sga or vice versa. Alternatively, a pattern that the adjacent lead sections Sga are equal in height may be combined.

The tip shapes of the lead sections Sga in the third embodiment may also be chamfered or partly concaved instead of being formed in a simple shape such as the slant surface C as long as those shapes are intended to guide a flowing direction of the weld bead Sgf.

REFERENCE SIGNS LIST

10 Stator
11 Teeth
12 Slot
13 Wedge paper
20 Stator core
25 Insulator
40 Rotor
D Flat rectangular conductor
M Rotary electric machine
SC Segment coil
Sg Segment
Sga Lead section
Sgb In-slot wire section
Sgc Non-lead section
Sge Crank portion
Sgf Weld bead
Sgg Ellipsoidal weld bead
Sgi Peeled portion

The invention claimed is:

1. A rotary electric machine comprising a stator including: a segment coil having a plurality of segments formed of a flat rectangular conductor subjected to bending; and a stator core having slots in which the segment coil is inserted,
   wherein welded parts formed at tips of lead sections of the segment coil,
      the lead sections extending in a vertical direction from an end face of the stator core and having different heights from each other, protruding out of the end face of the stator core so that the tips of the adjacent lead sections are parallel with each other, different in protruding height, perpendicular to the extending direction of the lead sections, and being twisted, include weld beads arranged in a radial direction of the stator, at least one of the weld beads having a long ellipsoidal shape that is long in a radial direction of the stator core,
      an angle between a longitudinal direction of the long ellipsoidal shape and an axial direction of the stator core is uniform among the weld beads and smaller than 90 degrees on a core cross section including a central axis of the stator core, the long ellipsoidal weld beads formed at the welded parts so that longitudinal directions of the weld beads are arranged radially on a lead side of the stator core, the long ellipsoidal weld beads arranged adjacently are aligned so that an axis of a first weld bead in the longitudinal direction and an axis of a second weld bead in the longitudinal direction are arranged in the same direction on a radial plane including a line passing the central axis of the stator core in which the first weld bead and the second weld bead are arranged, on the core cross section, and of the long ellipsoidal weld beads, an outermost weld bead placed on an outermost circumference side of the stator core or an innermost weld bead placed on an innermost circumference side of the stator core is different in an orientation of the longitudinal direction on the radial plane from the other weld bead or beads.

2. The rotary electric machine according to claim 1, wherein a top oval surface of at least one of the weld beads having the long ellipsoidal shape protrudes higher in the vertical direction than at least one of the adjacent lead sections.

\* \* \* \* \*